2,788,286

MANUFACTURE OF PHOSPHONITRILIC CHLORONITRIDE POLYMERS

Jayanti D. Teja and Robert A. Peters, New York, N. Y., assignors to Hess, Goldsmith & Co., Inc., New York, N. Y., a corporation of Delaware No Drawing. Application June 11, 1954, Serial No. 436,253

1 Claim. (Cl. 106—286)

This invention relates to processes for making polymers of phosphorous chloronitride and products therefrom; processes of coating glass textiles and resulting products.

Glass fibers and glass fabrics made therefrom are well known. Such fibers and fabrics are low in resistance to abrasion and resistance to breakage on flexing. Glass yarn has a high fragility. Coating thereof or application of a lubricating binder thereto to reduce such fragility has been proposed, but application of such coatings or binders, particularly permanent coatings, has been difficult.

The principal object of the invention, accordingly, is to provide a simple process and product therefrom for producing coating materials and to provide coating processes and products employing such coating materials which will do away with at least some of the difficulties mentioned.

The invention accordingly comprises the novel products as well as the novel processes and steps of processes according to which such products are manufactured, the specific embodiments of which are described hereinafter by way of example and in accordance with which we now prefer to practice the invention.

We have found, in accordance with our invention, that a suitable coating material may be formed by mixing ammonium chloride, phosphorous pentachloride, a catalyst such as quinoline, but without limitation, and a solvent therefor such as tetra chlorethane, but without limitation, said catalyst being adapted to catalyze the reaction between ammonium chloride and phosphorus pentachloride to form a polymer of phosphorous chloronitride, refluxing the mixture while liberating hydrogen chloride and removing the solvent to produce a mixed polymer of the trimer and heptamer of the phosphorous clhoronitride.

We have also found, in accordance with our invention, that by heating the mixture of trimer and heptamer mentioned we can convert substantially the entire polymer into the heptamer. The mixture of trimer and heptamer may then be applied in a solvent to glass fabric and on drying and heating the mixed polymer it is found to polymerize to a rubber-like material and there is a permanent chemical bond between the glass and the polymer so produced. It is our general observation that all of the polymers between the trimer and heptamer, namely the trimer, tetramer, pentamer, hexamer and heptamer, all react chemically with the glass to form a permanent chemical bond and may be employed for coating thereof. The reactivity of the trimer through the heptamer of phosphorous chloronitride with glass fibers and fabrics varies according to the polymer. The greatest reactivity has been found to be that between the trimer and glass. The tetramer and other polymers through the heptamer have a less activity, but all of them show a pronounced activity with glass.

We have also found, in accordance with our invention, that a polymer emulsion of one or more polymers of phosphorous chloronitride may be sprayed onto glass yarn immediately after drawing the yarn from the bushing and thereafter may be dried and heated to form a permanent chemically combined coating on the yarn of such polymer.

The lower polymers are cyclic compounds, the trimer being very similar in structure to benzene. The tetramer has a puckered ring structure as is probably the case with the others. These conclusions have been verified by X-ray diffraction experiments. The ring structures are quite stable. In the hydrolysis of the chloro groups, to cyclic analogs of the metaphosphinic acids, the ring remains intact. One chemical reaction so far discovered has been capable of accomplishing the ring rupture at ordinary temperatures. This reaction involves the aminolysis of the chloro groups by various amines such as aniline and primary aliphatic amines. A hydrolysis can be effected with relative ease by refluxing an ethereal solution containing the polymer and a little water or hydrochloric acid. Rupture of the ring also occurs at elevated temperatures, resulting in the formation of long-chain or side-chain $PNCl_2$ polymers.

There are several methods available for the preparation of the $PNCl_2$ polymers. In each case the whole spectra of polymer species is usually produced. It is from these reaction mixtures the individual polymers may be separated by fractional distillation or fractional crystallization in benzene. Each of the different methods of preparation of $PNCl_2$ gives a definite percentage of certain species. The polymers of the phosphorous chloronitride may also be made by treating liquid ammonia with phosphorous pentachloride.

The following are examples of the manner in which we now prefer to practice our invention. It is understood that these examples are illustrative and that the invention is not to be considered as restricted thereto except as indicated in the appended claim:

I. *Processes for forming polymers and their solutions or dispersions*

All proportions are by weight unless otherwise stated.

EXAMPLE 1

To a 20 litre flask forming part of a reflux condenser system containing 10 litres of tetra chlorethane is added 1500 grams of ammonium chloride and 5000 grams of phosphorous pentachloride. 500 grams of quinoline is added as a catalyst. The system is closed and the flask is heated to the refluxing temperature (145° C.) Hydrogen chloride is liberated and is allowed to escape out of the top of the reflux condenser. The reaction is allowed to reflux for six hours. At the end of the six hours, the flask is cooled to room temperature and the tetra chlorethane solution of the polymer former is decanted and filtered. The residue is saved and the solvent can be used in another further reaction. The reaction is carried out at atmospheric pressure.

The solution of the polymer mixture in tetra chlorethane is distilled to remove the solvent, leaving as a residue the polymer which consists of the trimer of phosphorous chloronitride which has the formula $(PNCl_2)_3$ in the proportion of about 35–40% and the heptamer of phosphorous chloronitride having the formula $(PNCl_2)_7$ in the proportion of about 55–60%. The mixture of these two materials may contain a small amount of impurities including the tetramer and some other polymers, but the amount of impurities is within the range of about 0–5%. The conversion to the mixture is approximately 90%. The yield of the mixture is about 95 to 100%. This mixture may be employed as such, in solution, for sizing of glass fibers and coating of glass fibers, among other uses. Such uses are described more fully below. We have found that the mixed trimer and heptamer gives a better bond on glass surfaces than the heptamer alone. Accordingly, in articles having relatively less glass surface for bonding we prefer to use the mixture of the trimer and heptamer. In articles where a relatively larger surface is available for bonding we prefer to use the heptamer as discussed below.

We have found, in accordance with our invention, that the mixture mentioned above of trimer and heptamer may be converted so that substantially all of the trimer is converted into the heptamer with a resulting composition consisting of essentially 100% heptamer to about 95% heptamer with 0-5% of other polymeric forms of the phosphorous chloronitride. Such conversion is accomplished by taking the mixture of trimer and heptamer and heating it with a controlled heat at approximately 100-115° C. for about 15 to 30 minutes.

The trimer may be obtained from the mixture of trimer and heptamer by vacuum distillation at 12 mm. of mercury at 135° C. Approximately 100% separation is obtained in this manner and the trimer per se may be employed for the treatment of glass as discussed below.

The characteristics of the trimer-heptamer mixture above are as follows:

It is substantially colorless to light straw color. It has a specific gravity of approximately 1.3 at 25° C. It has a viscosity of about 100 centipoises at 0° C. The mixture has a water-clear transparency. The mixture is soluble in benzene, toluene, xylene, and other low-boiling aromatic hydrocarbons or mixtures. The mixture of trimer and heptamer is less soluble in aliphatic hydrocarbons alone, but when such hydrocarbons are mixed with at least 60% of the low-boiling aromatic hydrocarbons, such as benzene, toluene and xylene, it readily dissolves.

The heptamer is substantially colorless to light straw in color. It has a viscosity of about 100 centipoises at about 0° C. It has a specific gravity of about 1.27 at 25° C. The mixture is soluble in benzene, toluene, xylene and other low-boiling aromatic hydrocarbons or mixtures. It is like the mixture mentioned in the last paragraph above. It is also relatively insoluble in aliphatic hydrocarbons alone but on mixing such hydrocarbons with at least 60% of the low-boiling aromatic hydrocarbons it readily dissolves.

The mixture of trimer and heptamer can be separated by fractional vacuum distillation. Substantially complete separation was effected by distillation at 12 mm. mercury at approximately 135° C.

We have found that by heating the heptamer at a temperature above 325° C. we may convert it into a mixture which will contain varying proportions of the trimer, tetramer, pentamer, hexamer and heptamer in accordance with the length of time of the heating. We have found:

1. The reaction is reversible at 325° C.
2. Below this temperature the reaction tends to go to the left. Above this temperature to the right. Starting with the very simple polymer $(PNCl_2)_3$ it is possible by heating below 325° C. to obtain the whole range of polymers, trimer to heptamer. Above 325° C. one can depolymerize back to the very simplest forms, like the trimer and tetramer.

These various polymers may be separated from one another to recover the substantially pure trimer, tetramer or other polymers up to and including the heptamer.

The physical properties of the polymers are listed below for comparison:

| Species | Solubility in ether, g./100° g. solvent | Solubility in benzene, g./100° g. solvent | Solubility in carbon tetrachloride, g./100° g. solvent | Melting point, °C. | Boiling point, 15 mm. | Boiling point, 760 mm. |
|---|---|---|---|---|---|---|
| $(PNCl_2)_3$ | 48 | 55 | 38.88 | 114 | 135 | 258 |
| $(PNCl_2)_4$ | 12 | 20 | 16.5 | 124 | 185 | 327 |
| $(PNCl_2)_5$ | Sol. | Very Sol. | | 40 | 222 | |
| $(PNCl_2)_6$ | Sol. | 10 | | 91 | 280 | |
| $(PNCl_2)_7$ | Slightly Sol. | >10 | Slightly Sol. | <0 | 290 | |

The direction of the reaction for the synthesis of the $PNCl_2$ polymers is as follows:

$$xPCl_5 + xNH_4Cl \rightarrow 4xHCl + (PNCl_2)_y$$

where $y$ is not less than 3. The reaction is exothermic and evolves approximately 120 kilocalories per mole of heat.

EXAMPLE 2

In a 2 litre Dewar flask containing 300 grams of liquid ammonia is added 10-100 ml. portions of a solution of 500 grams of phosphorous pentachloride dissolved in 1000 ml. of methylene chloride, each portion added every 10 minutes. The solution in the flask is continually stirred while these portions are added and the stirring is continued for an additional two hours. At the end of this time the mixture is filtered to remove any phosphorous pentachloride that is present, and any methylene chloride that remains is evaporated off, leaving a mixture of trimer and tetramer with 0-5% of other polymers that has substantially the properties given above.

We have found, in accordance with our invention, that the said mixture of trimer and heptamer, as well as the heptamer itself, and the mixture of trimer and tetramer, bond to glass, particularly to glass fibers and to fabrics to which applied. For example, we have worked with a boro silicate glass as set forth in the examples below and have found that the mixtures, as well as the heptamer alone and trimer through hexamer, react chemically with such glass. The mixtures, as well as the heptamer alone, trimer, tetramer, pentamer and heptamer, when so bounded are no longer soluble in the respective solvents therefor. We submit the following as proof of such chemical bonding.

If the phosphorous nitrochloride is heated up to 180-250° C. for one-half hour and the resulting highly polymerized material is then applied to glass, we do not get a satisfactory bond between the glass and the polymer. Tests show that the material produced by Examples 1 and 2 when heated up to 180° C. and then applied to glass fiber, are readily removed therefrom by treatment with benzene or similar solvent when immersed therein for 24 hours at room temperature. If the solution containing the material produced in Examples 1 and 2 is coated directly on glass fiber and is then subjected to a similar heat and time cycle or heated 10 minutes at 250° C., it cannot be removed by a similar immersion in benzene. The bonding may be one of the following:

1. Covalent bonding by means of an oxygen linkage between a phosphorus atom in the polymer chain and a silicon atom in the glass network.
2. Ionic interaction either through induced polarity on the chlorine groups or on the nitrogen atom in the polymer chain.
3. Pi bondal interaction.
4. Van der Wall forces.

The first type of linkage may be extended to cover the description of the bonding of $PNCl_2$ polymer to any other oxide surface. Chemicals which are capable of hydrolizing the chlorine off the polymer chain are useful for this purpose. Strong bases such as aniline accomplish this hydrolytic attack. Furthermore, Lewis Acids such as ferric chloride and aluminum chloride also facilitate the bonding of $PNCl_2$ to oxide surfaces. Additional modes of bonding may be employed.

There has been noted a considerable degree of difference between the bondability of certain species of lower molecular weight than of higher molecular weight. The bonding magnitude seems to increase if one starts with a lower molecular weight species of $PNCl_2$, i. e. solutions of the trimer, when polymerized, bond better to glass than solutions of the tetramer or higher species do.

EXAMPLE 3

As stated above, a mixture of the various polymers from the trimer to the heptamer inclusive can be prepared and then separated by frictional distillation. By suitably combining varying proportions of the separate polymers with one another thereafter we may obtain mixtures of polymers suitable for various types of treatment. Thus, by making a mixture of 50% trimer, 25% tetramer and 25% heptamer we have found that a polymer suitable for treatment of glass fibers as set forth below in Example 6 can be prepared.

II. *Treatment of glass fabrics and yarns with polymers of $PNCl_2$*

EXAMPLE 4

A light-weight woven boro-silicate glass fabric known as HG 116 made by Hess, Goldsmith & Co., Inc. which contains boro silicate yarns of 150 denier of the following construction: 68 ends by 58 picks per inch, is dip-coated in toluene and naphtha (50 parts by volume of each of the solvents, toluene and petroleum naphtha) containing 20% of the mixed trimer and heptamer in the proportions of 40% trimer to 60% of heptamer. Prior to dipping, the fabric to be treated is in one of the following forms: (a) untreated, (b) heat cleaned, (c) heat treated, (d) Garan treated i. e. silicone treated, (e) Volan treated i. e. treated with methyl methacrylate chelate of chromic chloride. The fabric is in contact with the solution for about ½ minutes and the solution is at room temperature. On removal from the solution the treated cloth is squeezed at about 40 p. s. i. and dried at approximately 100–130° C. to drive off the solvent. The so-treated fabric is then heated for 30 minutes at about 180° C. in a circulating hot-air oven. Such treatment causes the polymer mixture to bond to the glass as described above and the treatment gives a satisfactory bonding and polymerization of the resin.

EXAMPLE 5

A heavy-weight industrial boro-silicate glass fabric known as HG 181 made by Hess, Goldsmith & Co., Inc., containing boro silicate yarns of 150 denier of the following construction: 181 ends by 54 picks per inch, is dip-coated in a 10% toluene solution of the heptamer $(PNCl_2)_7$. Prior to dipping, the fabric to be treated has undergone a treatment in accordance with one of the treatments mentioned in Example 3 above. The fabric is in contact with the solution for about 30 seconds at room temperature. On removal from the solution the treated fabric is squeezed at approximately 20 lbs./sq. in. and dried at approximately 120–130° C. to drive off the solvent. The so-treated fabric is heated for 30 minutes at about 180° C. in a circulating hot-air oven. A satisfactory bond to the glass and polymerization of the resin is secured by this treatment.

The above fabric is regarded as a relatively stiff fabric. In order to produce a more flexible fabric the amount of heptamer in solution may be lowered to a desired content. For example, we have employed a 5% solution of the heptamer in the solvent to produce a coated fabric which has a greater flexibility than the one employing 10%. The amount of heptamer used, of course, will vary with the requirements as to flexibility or stiffness desired.

The coating solutions appear to impart a weave set to glass fabric. By weave setting we mean the setting of the weave of the fabric by the coating so that the fabric so coated tends to resist distortion when subjected to a pull in any direction. In the weave setting operation a firmer weave is set up in polymerizing from solutions containing the trimer than from solutions containing the higher polymers mentioned. A great increase in degree of weave setting can be achieved by incorporating various chemicals which will react by hydrolysis of the chlorine or polarization induced by aluminum chloride or similar acidic substance. The degree of weave set apparently corresponds to the degree of cross linkage which is achieved in the $PNCl_2$ polymer. The actual degree of functionality of the chemicals incorporated into the polymer is not as important as their degree of reactivity. It is found that a considerable increase in the durability of the weave set and corresponding lowering of the amount of time necessary to achieve this is given when such materials as diamines or ferric chloride or aluminum chloride are used. Aluminum trichloride appears to have the most powerful effect so far noted. The incorporation of basic fillers such as calcium carbonate, magnesium oxide, etc. again appears to have some effect in developing this cross linkage.

Because of the multiplicity of possible chemical attacks on the $PNCl_2$ polymer it is of course difficult to differentiate the effects of such things as aluminum chloride on cross linking from the effects it very possibly has on the polymerization rate. The incorporation of such basic fillers such as calcium carbonate, magnesium oxide, has some disadvantages in that even though it does increase the degree of cross linkage, if used in too excess amounts, it leaves the polymer open to attack by hydrolytic reagents. Inert types of fillers such as silicondioxide, calcium silicate, barium sulfate which have had occluded on their surfaces various bases such as sodium hydroxide, etc., may be used. Zinc oxide appears to have some curative powers suggesting that one possible mechanism of polymerization would be similar to that of neoprene.

Instead of coating the fabrics as above in Examples 3 and 4 we may apply polymers of $PNCl_2$ to glass fibers, preferably as they are drawn from the glass furnace and after cooling to room temperature. The following are examples of a process for treating glass fibers as we now prefer to practice it:

EXAMPLE 6

A glass polyfilament fiber have 102 or 204 filaments of boro silicate glass of 150 denier is sprayed with a water emulsion of a mixture of trimer, tetramer and heptamer of $PNCl_2$ containing the following ingredients:

| Substance: | Parts by weight |
|---|---|
| (Trimer—50%, tetramer—25%, heptamer—25%) | 100 |
| Oleic acid | 2 |
| Triton X45 (which is an alkyl aryl polyethoxy ethanol and is a non-ionic emulsifier | 1 |
| Water | 100 |

The ingredients are mixed together, placed in a ball mill or colloidal mill and milled for 72 hours. The resulting emulsion contains approximately 50% solids and this solution was sprayed, as stated, onto the glass fibers above. As so sprayed the material is ready for weaving. The so-treated fabric is passed as a flat web through a circulating hot-air oven in which it is heated for 30 minutes at about 180° C.

As stated above, in connection with the treatment of fabrics, the various materials such as diamines or calcium carbonate, manganese oxide, silica, calcium silicate, barium sulphate having occluded thereon sodium hydroxide, etc., may be employed. Zinc oxide may also be employed. These materials are incorporated in the mixture while milling. The proportion of these materials so milled will vary from 5 to 20 parts by weight in the above mixture.

EXAMPLE 7

Instead of the mixture of trimer 50%, tetramer 25%, and heptamer 25%, I may substitute an equal quantity, namely 100 parts, of heptamer in the above formula of Example 6. The processing of the mixture as so modified is then carried out exactly in the same manner as in Example 6. The same additions of fillers such as calcium carbonate, manganese oxide, and other substances mentioned in Example 6 may also be employed.

*Properties of fabrics and yarns coated as above*

The fabrics and yarns coated as above have been found to have new chemical and physical properties. Thus the glass of both the fabrics and the yarn is found to be chemically bonded to the various polymers from the trimer through the heptamer when cured as in the above examples. With respect to the physical properties of the coated materials, they have been found to resist the action of solvents, being substantially insoluble in all of the common organic solvents. Some swelling has been noticed when they are exposed to the aromatic hydrocarbons such as benzene and others. The polymer is also attacked by strong bases.

In addition, both the fibers and the fabric have unusual resistance to flexing and abrasion. Tests which we have made indicate that such resistance to flexing and abrasion is much greater than that possessed in the first place by the uncoated glass and is significantly greater than coatings made on glass by the various coating materials now known on the market. Both the yarns and fabrics have a significantly higher tensile strength as compared with the untreated fabric.

Yarn, when woven into a cloth, has increased strength both tensile and flexual and considerably increased abrasion resistance. All of these go to make a far superior fabric than is now on the market. Because of the multiplicity of chemical bonding possibilities the compatability and the bondability of the $PNCl_2$ treated yarns is astonishing. Cloth woven from these yarns bonds well to a wide range of organic resins used in coating and impregnating operations.

The concluding feature about sizing yarns with the $PNCl_2$ material is that after the heat treatment necessary to cure the lower polymers up to the rubber form, the yarns are quite resistant to heat and have a water repellent quality. Samples of the finished cloth whose filaments have been sized with the $PNCl_2$ polymer show no appreciable loss in flex and tensile strength after exposures lasting several days in length at temperatures at around 200 to 250° C. There appears to be no appreciable decomposition at temperatures below 350° C. Above 400° C. the polymer does undergo a slow decomposition. The material, of course, is non-inflammable.

The same properties such as increase in abrasion, resistance, flex strength, tensile strength, resistance to elevated temperature, resistance to chemicals other than strong bases, weave set characteristics, wide compatibility range with various organic and natural resins can be extended to any of the current fabrics. These coating operations may actually be thick films applied by knife coating, calendering, dip coating or roller transfer coating or may be cloths that are saturated with solutions of the lower polymers and then cured at the higher temperatures.

What we claim is:

A process which comprises mixing tetra chlorethane, ammonium chloride, phosphorous pentachloride and quinoline, refluxing the mixture at a temperature of about 145° C., liberating hydrogen chloride, decanting the tetra chlorethane solution of the polymer mixture formed, distilling and removing the tetra chlorethane leaving a residue consisting of the trimer of phosphorous chloronitride in the proportion of about 35–40% and the heptamer of phosphorous chloronitride in the proportion of about 55–60% together with about 0–5% of impurities including the tetramer and other polymers.

References Cited in the file of this patent

UNITED STATES PATENTS

| | | |
|---|---|---|
| 2,334,710 | Kauth | Nov. 23, 1943 |
| 2,637,704 | Hurley | May 5, 1953 |

OTHER REFERENCES

Chem. Rev. 32, 109–33, 1943.